(12) United States Patent
Gordon

(10) Patent No.: US 11,969,873 B2
(45) Date of Patent: Apr. 30, 2024

(54) AUTOMATIC EXTENDING DEVICE

(71) Applicant: Kyle Edward Gordon, Rancho Cucamonga, CA (US)

(72) Inventor: Kyle Edward Gordon, Rancho Cucamonga, CA (US)

( * ) Notice: Subject to any disclaimer, the term of this patent is extended or adjusted under 35 U.S.C. 154(b) by 345 days.

(21) Appl. No.: 17/310,915

(22) PCT Filed: Dec. 31, 2020

(86) PCT No.: PCT/US2020/067630
§ 371 (c)(1),
(2) Date: Aug. 31, 2021

(87) PCT Pub. No.: WO2022/146439
PCT Pub. Date: Jul. 7, 2022

(65) Prior Publication Data
US 2023/0278189 A1    Sep. 7, 2023

(51) Int. Cl.
| | | |
|---|---|---|
| *B25G 1/10* | (2006.01) | |
| *B25G 1/04* | (2006.01) | |
| *F16B 7/10* | (2006.01) | |
| *H02G 1/02* | (2006.01) | |

(52) U.S. Cl.
CPC .................. *B25G 1/04* (2013.01); *F16B 7/10* (2013.01); *H02G 1/02* (2013.01)

(58) Field of Classification Search
CPC .... A47L 9/32; B25G 1/04; B25G 3/12; B25G 3/18; B25G 3/04; B05C 17/0205; F16B 7/10; F16B 7/105; F16B 7/042; B21D 39/04; B21D 39/046; Y10T 403/32467; Y10T 403/598; Y10T 403/7079; Y10T 403/32475; Y10T 15/10; H02G 1/02
See application file for complete search history.

(56) References Cited

U.S. PATENT DOCUMENTS 2,299,785 A    10/1942    Barrett
2,327,163 A     8/1943    Barrett
(Continued)

FOREIGN PATENT DOCUMENTS

| GB | 2497921 A | * | 7/2013 | ............. B60R 11/04 |
|---|---|---|---|---|
| KR | 20160130553 A | | 11/2016 | |
| WO | WO-02066771 A1 | * | 8/2002 | ........... E04H 12/182 |

*Primary Examiner* — Chuck Y Mah
(74) *Attorney, Agent, or Firm* — Carson Patents; Gregory D Carson, Patent Attorney

(57) ABSTRACT

The Automatic Extending Device is an internally powered controlled automatic extension and retraction device of lengths of twelve meters or more in extended length that can support up to one hundred eighty one kilograms or more positioned on the far end away from the operator. The device is comprised of: a plurality of telescoping nested sliding extensible pole segments attached to an internally powered pole extension and retraction device comprised of a one way bearing with friction clutch; a tapered push/pull strip; a high friction drive wheel; a push/pull strip friction pinch wheel assembly; a strip guide to maintain push/pull strip location/position; and a push/pull strip spool which contains the push/pull strip when not extended into the pole. The device of the present invention does not conduct electricity, so it is safe for use in, around, and with powered lines, devices, or fixtures.

16 Claims, 4 Drawing Sheets

(56) References Cited

U.S. PATENT DOCUMENTS

| | | | |
|---|---|---|---|
| 3,434,674 A * | 3/1969 | Groskopfs | H01Q 1/087 242/390.2 |
| 3,499,610 A * | 3/1970 | Hamlin | H01Q 1/087 242/390.2 |
| 4,924,573 A * | 5/1990 | Huddleston | A01G 3/086 30/296.1 |
| 5,718,087 A * | 2/1998 | Featherstone | E04H 12/182 52/118 |
| 6,247,991 B1 * | 6/2001 | Chen | A63H 33/00 74/89.22 |
| 6,494,636 B1 * | 12/2002 | Mozena | A63C 11/221 403/349 |
| 6,573,868 B2 | 6/2003 | Johnson et al. | |
| 9,009,921 B1 * | 4/2015 | Ramsey | B25G 1/04 16/436 |
| 9,359,063 B2 * | 6/2016 | Pisacreta | F02C 7/06 |
| 9,522,466 B2 * | 12/2016 | Conway | B25G 1/04 |
| 9,610,678 B2 * | 4/2017 | Shields | B25G 1/04 |
| 9,995,993 B2 | 6/2018 | Li | |
| 2009/0110527 A1 * | 4/2009 | Kardohely | E04H 12/182 414/567 |
| 2011/0101716 A1 | 5/2011 | Nolte et al. | |
| 2012/0138112 A1 * | 6/2012 | Chen | A45B 25/16 135/24 |
| 2022/0340307 A1 * | 10/2022 | Hensley | B64G 1/222 |

* cited by examiner

AUTOMATIC EXTENDING DEVICE

TECHNICAL FIELD OF THE INVENTION

This invention relates to hand held devices, methods or apparatus specially adapted for installing, maintaining, repairing or dismantling overhead lines, cables, light bulbs, fans, vents, and any other objects or devices positioned, installed, or located overhead. This invention relates to handles or other constructions of telescopic, extensible, or sectional poles and/or sticks to hold or position tools in overhead and/or remote locations.

BACKGROUND

Today's telescopic or extendable poles consist of manual and automatic models.

There are manual telescoping or extendable poles as in US Patent Application Publication US 2011/0101716 A1, for a Utility Pole with Removable Supporting Push Button, dated May 5, 2011 by Nolte, et, al. wherein there is an extendable pole with telescoping sections that can be fixed into position with a push button assembly. And as in U.S. Pat. No. 9,995,993 B2, Selfie Device, to Li, Jun. 12, 2018 wherein there is an extendable stick with sliding sections that is held in position while extended with a mechanical clamping mechanism.

There are automatic telescoping or extending sticks as in Korean Patent KR20160130553A for an Automatic Length-Adjustable Selfie Stick wherein there is a powered unwinding and winding of a strip that is pushed into the connecting sections of a telescoping or extending stick to position a smartphone for camera use away from its user.

There is not presently any available automatic telescoping or extending stick or pole that is non-conductive, up to forty feet (about twelve meters) in length when extended and still sufficiently light weight so as to allow the connection and use of tools at the extended end for installing, maintaining, repairing or dismantling overhead lines, cables, light bulbs, fans, vents, and any other objects or devices positioned, installed, or located overhead.

BRIEF SUMMARY OF THE INVENTION

According to a first aspect of the invention I have invented an extending device for operating on objects overhead. The device may operate automatically, or manually or power assisted by a motor under user control. The automatic extending device preferably comprises a plurality of telescoping nested sliding extensible pole segments attached to an internally powered pole extension and retraction mechanism. Preferably the internally powered pole extension and retraction mechanism comprises a control/power switch to advance and retract said extensible pole segments. The pole segments may be advanced or retracted with a one-way bearing with friction clutch which engages only when retracting said extensible pole segments. The friction clutch is provided to prevent binding and maintain position of a tapered push/pull strip. Preferably there is included a high friction drive wheel for position control of any extended length. Preferably there is a push/pull strip friction pinch wheel assembly with adjustable force to maintain the extended length of said extensible pole segments and support weight, especially the weight of an object help above a user using the automatic extending device. Preferably there is a push/pull strip guide to maintain said push/pull strip position when extending or retracting said extensible pole segments, and a push/pull strip spool which contains said push/pull strip when said push/pull strip or a portion of the push/pull strip when the push/pull strip is fully retracted or partially retracted to retract said extensible pole segments. Preferably retraction or extension is under the control of said one-way bearing with friction clutch powered with controlled movement of said high friction drive wheel using said control/power switch.

According to a second aspect of the invention there is an Extending Device for operating on objects overhead, comprising: an extendable pole; a push/pull strip connected to and between a spool assembly and a distal end of said extendable pole to change a length of the pole; a drive intermediate said spool assembly and extendable pole to push said push/pull strip toward the distal end of the extendable pole; a pinch assembly to pinch said push/pull strip against the drive to maintain the length of the extendable pole; wherein said spool assembly comprises a one-way clutch bearing turn-able by said drive both forward to freewheel as the drive pushes said push/pull strip and reverse to engage to pull said push/pull strip away from the distal end of the extendable pole. The extending device may operate automatically, or manually or power assisted by a motor under user control.

Pushing said push/pull strip toward the distal end of the extendable pole increases the length of a portion of strip intermediate the drive and distal end. Pulling said push/pull strip away from the distal end of the extendable pole decreases the length of a portion of the strip intermediate drive and distal end.

So I have now invented an automatic extending device that may be non-conductive, with internally powered controlled automatic extension to lengths of forty feet (about twelve meters) or more and automatic retraction of the extended length, while holding and/or supporting up to four hundred pounds (about one hundred eighty one kilograms) positioned on the end to be extended away from the operator of the automatic extending device.

The device of the present invention may be comprised of at least these components/mechanisms/elements in order to safely extend and retract automatically with the use of a control button located upon the invented device: a one way bearing that only engages a friction clutch when the pole is retracting to guide the return of a push/pull strip and free wheels when extending; the friction clutch to prevent binding of the push/pull strip as it is retracted and coiled into the collapsed pole position/length; the push/pull strip with is tapered to fit inside a continuously decreasing interior diameter of pole extension elements, a high friction drive wheel to ensure sufficient push on the push/pull strip for rapid and smooth extension of the pole; a push/pull strip friction pinch wheel assembly to control the position push/pull strip; a strip guide to maintain the push/pull strip location/position as the push/pull strip is pushed or pulled away from or onto (a) push/pull strip spool which contains the push/pull strip when not extended into the pole. Preferably the device of the present invention does not conduct electricity so it is safe for use in, around, and with electrically powered lines, or fixtures.

Further disclosure of the invention is disclosed by the claims.

BRIEF DESCRIPTION OF THE DRAWINGS

The invention may be better understood by reference to the accompanying drawings, wherein.

DETAILED DESCRIPTION

The detailed embodiments of the present invention are disclosed herein. The disclosed embodiments are merely exemplary of the invention, which may be embodied in various forms. The details disclosed herein are not to be interpreted as limiting, but merely as the basis for the claims and as a basis for teaching one skilled in the art how to make and use the invention.

References in the specification to "one embodiment," "an embodiment," "an example embodiment," etcetera, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Figure 1:
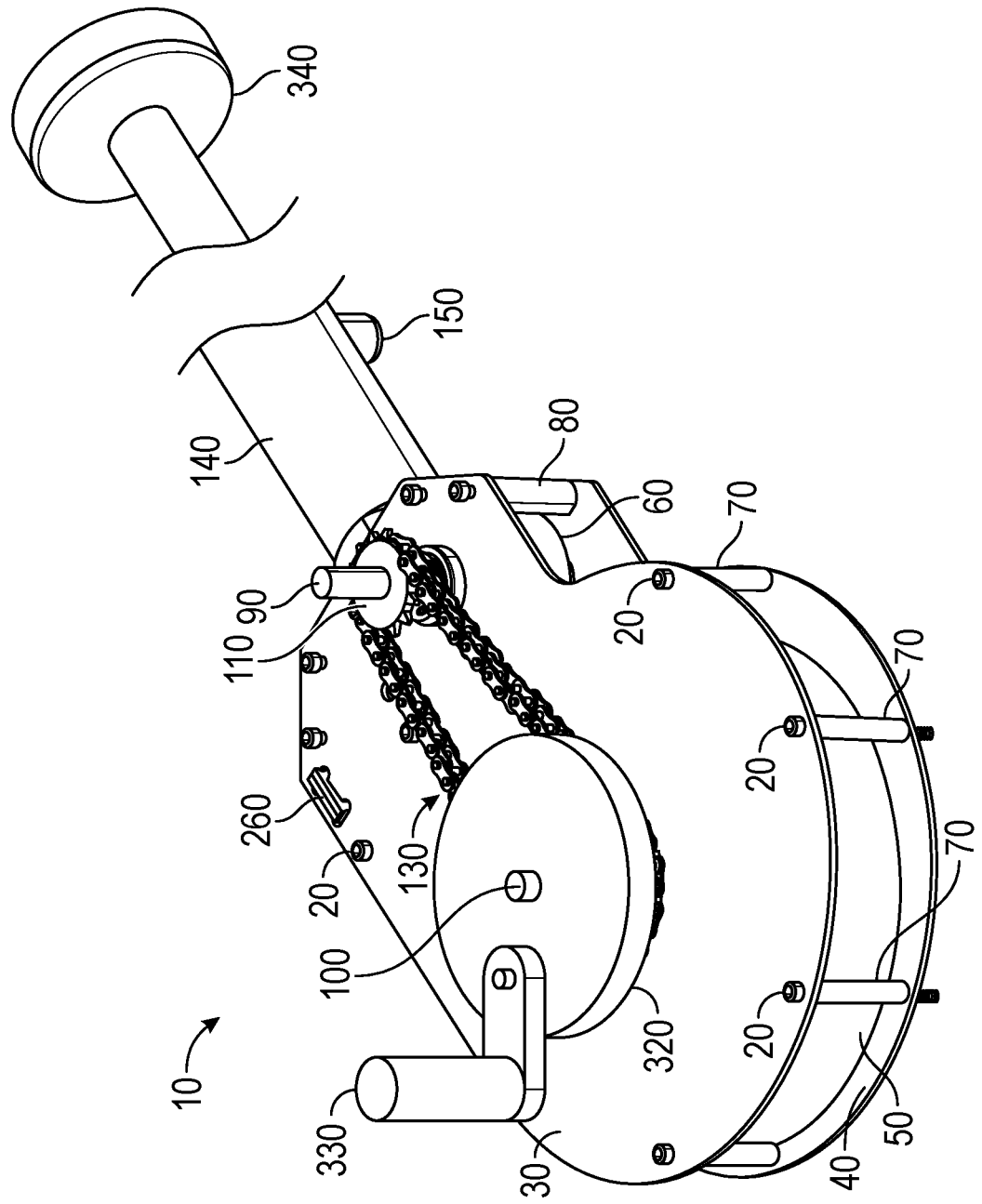
FIG. 1 is a perspective view of an embodiment of the apparatus according to the invention.

Referring to the Figures, FIG. 1 shows the complete device of the present invention, (10) as indicated on the figure, with the extendable pole truncated to show the exterior detail of the drive for the push/pull strip (50). In this figure, element 10 is the complete device of the present invention. Element 20 is a bolt with threaded end which is used to connect the drive unit bottom cover plate (40) and the drive unit top cover plate (30). Element 50 is the push/pull strip which is tapered lengthwise. The push/pull strip is used to extend and/or retract the collapsed sections of the attached pole. Element 60 is the drive wheel. Element 70 is a hollow tube separator. Element 80 is a strip guide/transition which guides the push/pull strip between the drive unit and the extensible pole segments. Element 90 is a drive wheel assembly axle. Element 100 is the spooling assembly axle. Element 110 is drive assembly gear/cog connected to the drive wheel assembly axle 90 to turn the drive wheel. Element 120 is a one-way bearing which spools when the spooling assembly axle 90 turns a first direction and engages when the spooling assembly axle 90 turns the counter direction. Element 130 is the drive chain by the drive assembly gear 110 turns the one way bearing 120. Element 140 is the extensible tube assembly (a series of telescoping nested sliding tubes). Element 150 is the control or power button. Element 260 is a pinch wheel assembly fixed position plates. Element 320 is a spool wheel. Element 330 is a manual crank. Element 340 is an object holder.

Figure 2:
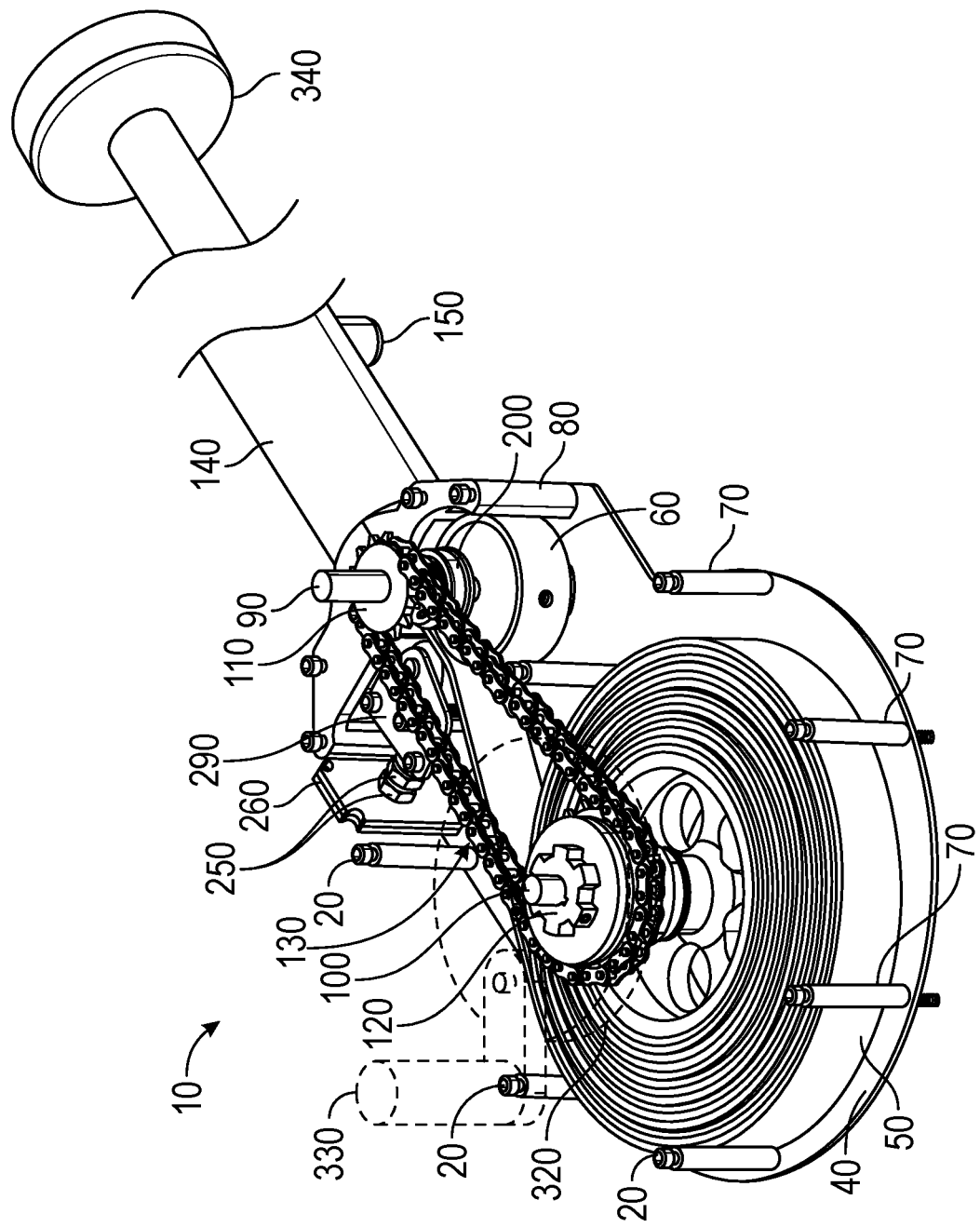
FIG. 2 is cut away view of an embodiment of the apparatus to expose the internal elements according to the invention.

Referring to the Figures, FIG. 2 shows the complete device of the present invention (10) with the extensible pole truncated and the drive unit cover plate (30) not shown to show some interior detail of the drive for the push/pull strip (50). Element 20 are the threaded bolts. Element 40 is the drive unit bottom cover plate. Element 60 is the drive wheel. Element 70 is a hollow tube separator. Element 80 is the push/pull strip guide/transition between the drive unit and the extensible pole segments. Element 90 is the drive wheel assembly axle. Element 100 is the spooling assembly axle. Element 110 is the drive assembly gear/cog. Element 120 is a one-way bearing. Element 130 is the drive chain. Element 140 is the extensible tube assembly. Element 150 is the control or power button. Element 200 is a top side drive unit bearing. Element 250 is the pinch wheel assembly force (friction) adjustment nuts. Element 260 is the pinch wheel assembly fixed position leverage plates. Element 290 is pinch wheel assembly top cover plate. Element 320 is a spool wheel. Element 330 is a manual crank. Element 340 is an object holder.

Figure 3:
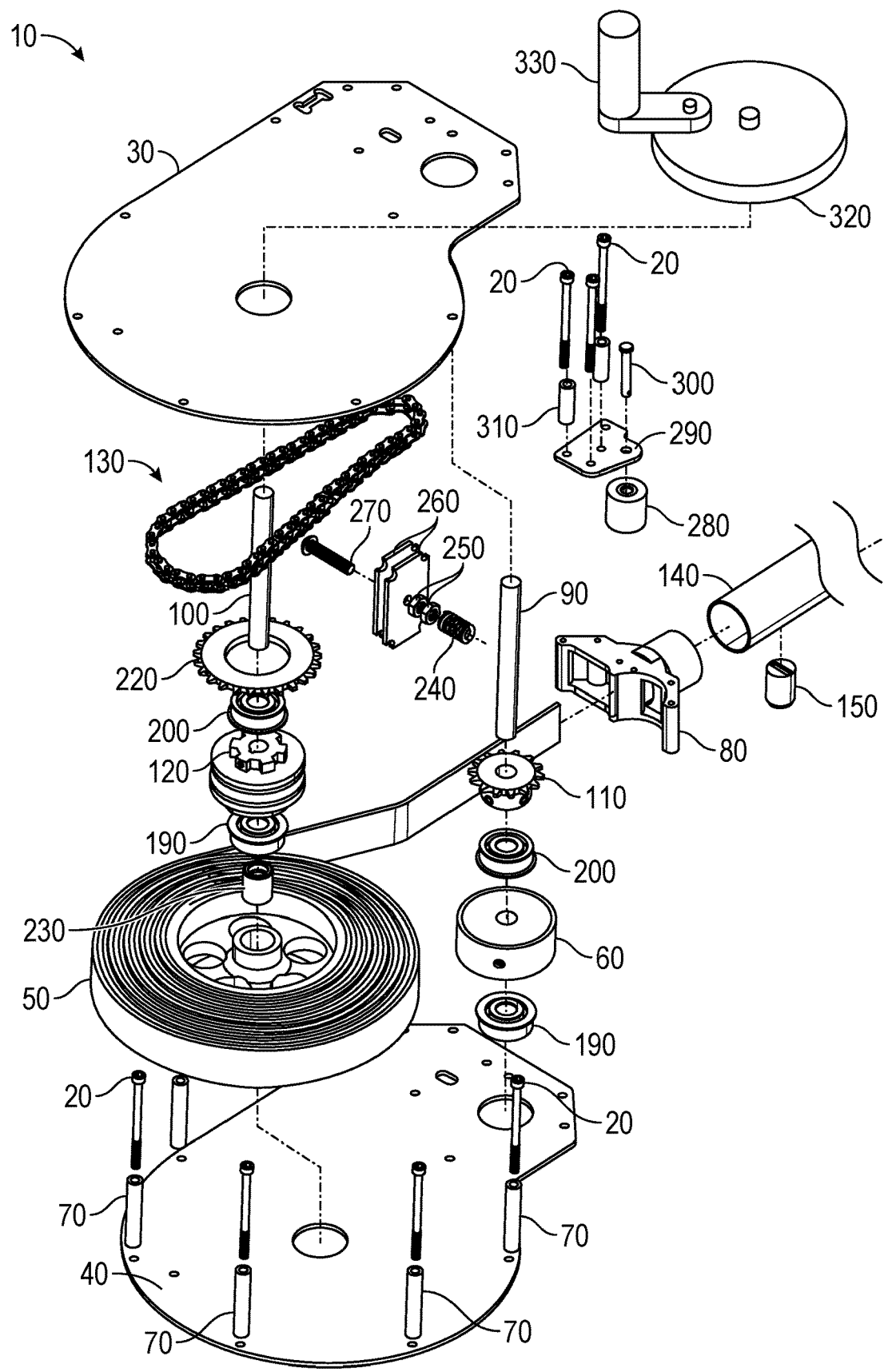
FIG. 3 is an exploded view of an embodiment of the apparatus according to the invention.

Referring to the Figures, FIG. 3 shows the complete device of the present invention (10) with the extendable pole truncated to show the exterior detail of the drive for the push/pull strip (50) and the drive unit. This figure is shown in exploded view. In this figure, element 10 is the complete device of the present invention. Element 20 is a bolt with threaded end which is used to connect the drive unit bottom cover plate (40) and the drive unit top cover plate (30). Element 50 is the tapered push/pull strip used to extend and/or retract the nested telescoping sections of the attached pole (140). Element 60 is the drive wheel. Element 70 is a hollow tube separator. Element 80 is the push/pull strip guide/transition between the drive unit and the extensible pole segments. Element 90 is the drive wheel assembly axle. Element 100 is the spooling assembly axle. Element 110 is the drive assembly gear/cog. Element 120 is a one-way bearing. Element 130 is the drive chain. Element 140 is the extensible tube assembly. Element 150 is the control or power button. Element 190 is a bottom side drive unit bearing. Element 200 is a top side drive unit bearing. Element 220 is spool assembly gear/cog. Element 230 is the spool assembly spacer ring. Element 240 is the pinch assembly push arm spring for applying pressure to Element 280 which is the pinch wheel. Element 250 is the pinch wheel assembly force (friction) adjustment nuts. Element 260 is the pinch wheel assembly fixed position leverage plates. Element 270 is the pinch wheel assembly force (friction) adjustment bolt. Element 290 is the pinch wheel assembly top cover plate. Element 300 is the pinch wheel threaded bolt to hold the pinch wheel in position. Element 310 is the pinch wheel assembly bolt spacers. Element 320 is a spool wheel. Element 330 is a manual crank.

Figure 4:
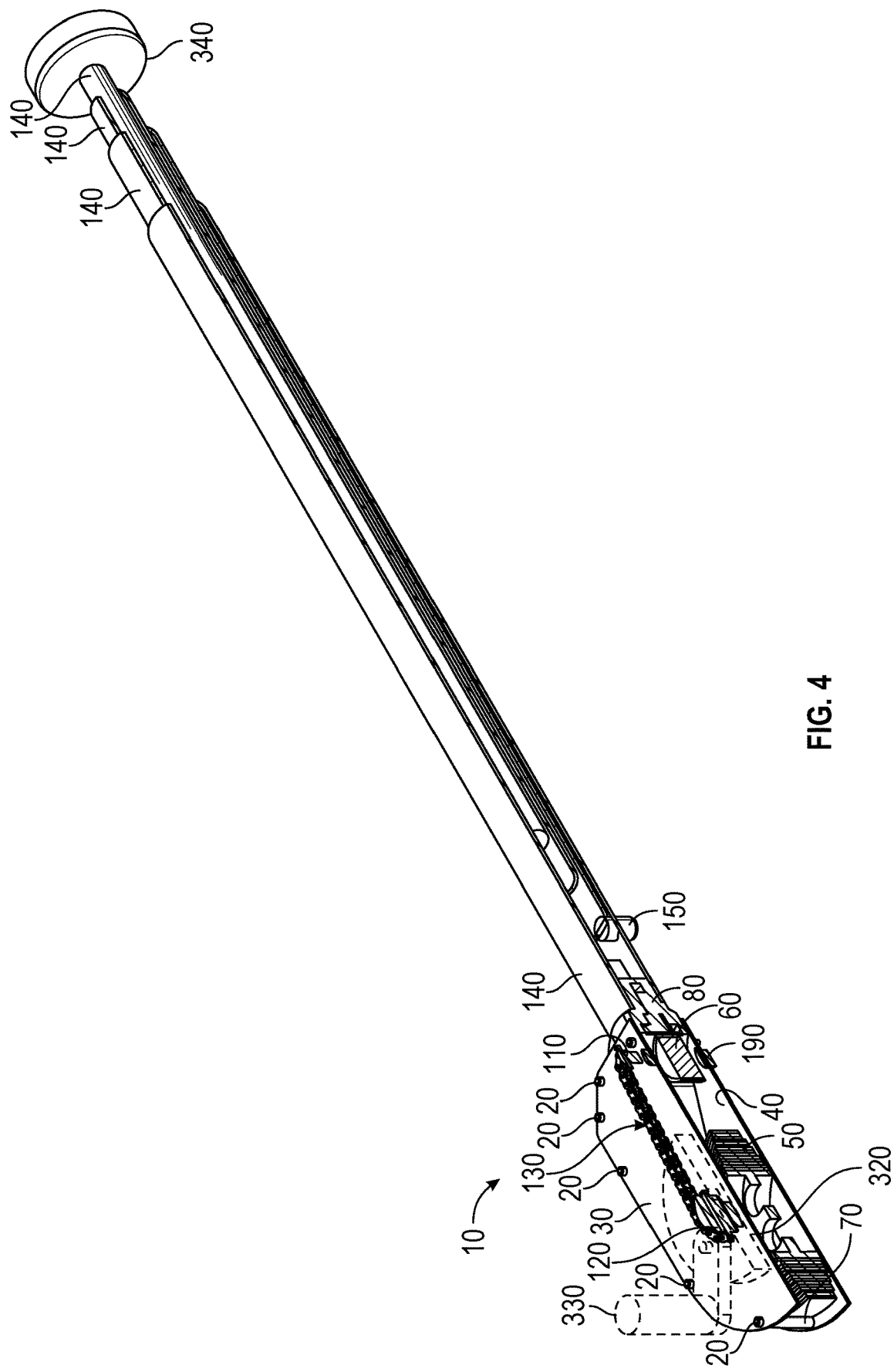
FIG. 4 is a half section view of an embodiment of the apparatus according to the invention.

Referring to the Figures, FIG. 4 shows the complete device of the present invention (10), with the extensible pole (140). The device is shown with a half section removed to highlight the components/elements therein. Element 20 is a bolt with threaded end which is used to connect the drive unit bottom cover plate (40) and the drive unit top cover plate (30). Element 50 is the tapered push/pull strip used to extend and/or retract the nested telescoping sections of the attached pole (140). Element 60 is the drive wheel. Element 70 is a hollow tube separator. Element 80 is the push/pull strip guide/transition between the drive unit and the extensible pole segments. Element 110 is the drive assembly gear/cog. Element 120 is a one-way bearing. Element 130 is the drive chain. Element 140 is the extensible tube assembly. Element 150 is the control or power button. Element 190 is a bottom side drive unit bearing. Element 320 is a spool wheel. Element 330 is a manual crank. Element 340 is an object holder.

As shown in FIG. 4 the automatic extending device is comprised of a plurality of connected telescoping nested sliding tube or pole sections (140) with an internally powered pole extension and/or retraction device comprised of a one way bearing; a friction clutch, a tapered push/pull strip, a high friction drive wheel, a push/pull strip friction pinch wheel assembly, a strip guide to maintain push/pull strip location/position, and a push/pull strip spool which contains the push/pull strip when not extended into said pole.

As shown in FIG. 3, the push/pull strip (50) drive assembly of the drive of the present invention is comprised of a bottom side drive unit bearing (190), the drive wheel (60), a top side drive unit bearing (200), the drive unit assembly gear/cog (110), and the drive unit axle (90). The drive wheel (60) needs to have a high friction coefficient, meaning the drive wheel can impart sufficient friction to stop the motion of the push/pull strip or to force its advancement into the extensible segments of the attached pole sections. The drive assembly pushes and/or pulls the push/pull strip (50) into or out of the connected extensible pole sections under the control of the control/power button (150) through the push/pull strip guide/transition (80) between the drive unit and the extensible pole segments. The control/power button (150) has operator manipulatable controls for extension, retraction, power-on, power-off, and emergency release for manual retraction or extension.

As shown in FIG. 3, the push/pull strip (50) pinch wheel assembly of the device of the present invention is comprised of a plurality of threaded bolts (20) and pinch wheel assembly bolt spacers (310) used to hold into position the following elements: the pinch assembly push arm spring (240) for applying pressure to, the pinch wheel (280), the pinch wheel assembly force (friction) adjustment nuts (250) to position the push arm spring (240) for the proper amount of push/pull strip position holding strength, the pinch wheel assembly fixed position leverage plates (260), the pinch wheel assembly force (friction) adjustment bolt (270), the pinch wheel threaded bolt (300) to hold the pinch wheel (280) into position, and the pinch wheel assembly top cover plate (290).

The pinch wheel assembly can be adjusted to maintain the position holding strength and pole weight supporting strength. In the current embodiment, the spring is adjusted between one hundred pounds (about forty five kilograms) and four hundred pounds (about one hundred eighty one kilograms) of force, thus enabling the device to support (hold up) the amount of weight set by setting or adjusting the friction force of the pinch wheel assembly with the pinch wheel assembly force (friction) adjustment nuts (250), and the pinch wheel assembly force (friction) adjustment bolt (270).

A high friction drive motor drive wheel (60) is used to push and/or pull the push/pull strip (50) to both overcome the friction holding force of the pinch wheel assembly and to maintain the position of the push/pull strip's position as advanced or retracted under the control of the control/power button (150).

This unique combination of the high friction drive assembly and the adjustable force pinch wheel assembly provides the unique capability of the device to be extended to any length of the device from its fully collapsed length to its fully extended length and maintain the weight holding capacity of the device. This controlled powered adjustable friction force drive combination to propel or retract the push/pull strip (50) enables all manner of utility in reaching and supporting remote objects with the device of the present invention that are removed from the user by any length of the device from fully collapsed to fully extended.

As shown in FIG. 3, the push/pull strip (50) spool assembly is composed of the spool assembly spacer (230), a bottom side drive unit bearing (190), a one-way bearing (120), a top side drive unit bearing (200), the spool assembly gear/cog (220), and the spool assembly axle (100). The spool assembly has the push/pull strip wrapped around it and connected at the wide end. The push/pull strip (50) is designed such that it is wider at the base end connected to the spool assembly than it is at its connection point in the upper section of the extensible pole segments so that the push/pull strip will fit inside the full length of the extensible pole sections attached to the drive unit via the push/pull strip guide/transition (80) between the drive unit and the extensible pole segments. The spool assembly holds the push/pull strip (50) that is not extended into the nested telescoping sections of the attached pole (140).

As shown in FIG. 3, the push/pull strip (50) strip guide transition element (80) connects the drive assembly and the extensible sections of the pole. The push/pull strip (50) is connected to and between the spool assembly and the furthest end section of the nested telescoping sections of the attached pole (140).

The strip guide transition element (80) ensures that the push/pull strip (50) is maintained in the proper position to extend or retract the push/pull strip (50) smoothly when moved into and out of the extensible tube assembly (a series of telescoping nested sliding tubes) (140) by the combination of the high friction drive assembly and the adjustable force pinch wheel assembly.

The drive chain (130) wraps around the drive assembly gear/cog (110) and the spool assembly gear/cog (220) controlling the advancement or retraction of the push/pull strip (50) through the use of the control/power button (150).

The one-way bearing (120) that is part of the spool assembly only engages (helps control the rewinding of the push/pull strip (50)) when retracting the pole. It allows the push/pull strip (50) to free wheel (move without restriction) when extending the pole. This one-way bearing (120) provides essential control for the retraction of the push/pull strip (50) and affords free forward motion of the push/pull strip when the device is extending or advancing in length.

A friction clutch is a part of the spool assembly incorporated into the one-way bearing (120) shown in the figures. The friction clutch function is an essential component of the present invention. A friction clutch in combination with the one-way bearing (120) is used to prevent binding of the push/pull strip (50) as the push/pull strip (50) is wound back onto the spool assembly as controlled by the control/power button (150).

It is the new combination of a friction clutch and the one-way bearing (120) which allows the device of the present invention to advance and retract under competent powered control of the control/power switch (150) advancing or retreating the push/pull strip (50) into or out of the extensible tube assembly (a series of telescoping nested sliding tubes) (140). This combination of features enables the device of the present invention to be substantially longer (forty feet (about twelve meters) in the case of the present embodiment) and much stronger (weight holding capacity of up to four hundred pounds (about one hundred eighty one kilograms)) in its ability to support (hold up) weight at any given advanced or retracted position as set by the use of the control/power switch (150).

The present embodiment of the device as shown in the figures can advance the extensible pole to a full length of forty feet (about twelve meters) or any length between the collapsed length and its full extended length. With the combination of the controls of the present device and the mechanics of the device as herein configured, the automatic extending device can be set at any length between its fully collapsed length (about four and half feet—1.4 meters) and the fully extended length. Further with this combination of controls and the mechanics therein, the automatic extendable pole as presented provides a tool/supported weight limit of four hundred pounds (about one hundred eighty one kilograms).

The control/power switch (150) is designed to control the movement of the delivery of battery (batteries can be housed and connected to the parts from any available space in the device) power to the drive assembly and accordingly the spool assembly by way of the drive chain (130) connecting the drive and spool assemblies. The control/power switch (150) is used to advance or retract the extensible pole sections by pushing of buttons on the control/power switch (150). The control/power switch (150) is mounted on the device. In the present embodiment it is mounted on the first section of the extensible pole, but it is noted that this switch set can be mounted in other locations on the exterior of the device.

In the case of the current embodiment the device is assembled by placing the drive assembly, the pinch wheel assembly, and the spooling assembly with the push/pull strip attached and wound around on top of the bottom cover plate (40) feeding the push/pull strip through the push/pull strip guide/transition (80) and onward into the connected segments of the extensible pole with the control/power switch (150) attached to the outside of the first extensible pole section. The top cover (30) is placed on top of the assembled and placed components and the hollow tube separators (70) are placed between the top (30) and bottom (40) cover plates and the parts are secured together with the threaded end bolts (20).

It can be immediately appreciated that the device of the present invention can be built as a very long extensible non-electrically conductive pole using fiberglass or any other suitable non-electrically conductive material as is done in the present embodiment presented herein. In fact the present prototype is forty feet (about twelve meters) long and made of fiberglass. This configuration is not intended to impart any limitation on the construction of the device of the present invention. An automatic extensible non-electrically conductive pole can be made using the present invention at any desired length with suitable scaling of the components.

Other materials and components can be used to make the device lighter, longer, shorter, faster, slower, and capable of holding more weight in its extended position. Depending upon the desired use for the present invention, the device can be sized (engineered) to the task. The current embodiment is a forty foot long version of the present invention useful for tree trimming, hanging strings of electrical lighting or fixtures, and/or working with electrical wires overhead. However, almost any practical length is possible. For example an eight or ten foot version could be built for changing light bulbs and fixtures on high ceilings inside buildings or on exterior lighting devices.

In operation, the device of the present invention uses the drive assembly and pinch wheel assembly to control the advancement of the push/pull strip (50) up into the connected plurality of connected pole segments comprising the extensible pole, while the one-way bearing is not engaged on the spool assembly permitting free wheeling (unrestricted unspooling) of the push/pull strip (50) from the spool assembly. The control/power switches (150) are used to power on and off the drive assembly. The drive assembly also drives the spooling assembly via the connecting drive chain (130) running between the gears/cogs on the top of the drive assembly and the spooling assembly.

The combination of the high friction drive assembly and pinch wheel assembly interconnection to propel and retract the push/pull strip at a controllable rate and stop/restart the extension to any partially extended length between the fully collapsed length and the fully extended length combined with the friction clutch and one-way bearing on the spooling assembly which prevents binding as the push/pull strip (50) is retracted back into the drive unit offers the capacity to extend and retract the extensible length of the device throughout the full range of its extensible length and maintain the devices ability to hold and support weight. In the case of the current embodiment, the device of the present invention can hold or support up to four hundred pounds (about one hundred eighty one kilograms) weight in tools or objects at its extended end.

In a preferred embodiment of the present invention, there is an automatic extending device for operating on objects overhead, comprising: an extendable pole; a push/pull strip connected to and between a spool assembly and a distal end of said extendable pole to change a length of the pole; a drive intermediate said spool assembly and extendable pole to push said push/pull strip toward the distal end of the extendable pole; a pinch assembly to pinch said push/pull strip against the drive to maintain the length of the extendable pole; wherein said spool assembly comprises a one-way clutch bearing turnable by said drive both forward to freewheel as the drive pushes said push/pull strip and reverse to engage to pull the push/pull strip away from the distal end of the extendable pole.

In an alternate embodiment of the present invention, there is an automatic extending device wherein said pinch assembly comprises a resilient actuator or spring arranged to exert a consistent force to regulate slippage of said push/pull strip on said drive.

In an alternate embodiment of the present invention, there is an automatic extending device wherein said pinch assembly comprises a resilient actuator or spring arranged to exert a consistent force to regulate slippage of said push/pull strip on said drive wherein said pinch assembly comprises an external grasp to adjust said force.

In an alternate embodiment of the present invention, there is an automatic extending device wherein said pinch assembly comprises a pinch wheel, said push/pull strip pinched intermediate said drive and said pinch wheel.

In an alternate embodiment of the present invention, there is an automatic extending device comprising a loop belt or chain connecting said drive and said spool assembly.

In an alternate embodiment of the present invention, there is an Automatic extending device comprising a loop belt or chain connecting said drive and said spool assembly wherein the loop belt or chain has an exposed portion to manually move said drive and said spool assembly to extend and to retract said extendable pole.

In an alternate embodiment of the present invention, there is an automatic extending device wherein the extendable pole comprises a plurality of nested sliding extensible pole segments arranged to slide upon urging by said push/pull strip.

In an alternate embodiment of the present invention, there is an automatic extending device comprising a loop belt or chain connecting said drive and said spool assembly wherein the loop belt or chain has an exposed portion to manually move said drive and said spool assembly to extend and to retract said extendable pole including at least a first segment fixed to a housing of said spool assembly, drive and pinch assembly.

In an alternate embodiment of the present invention, there is an automatic extending device wherein the extendable pole comprises a plurality of nested sliding extensible pole segments arranged to slide upon urging by said push/pull strip including at least a second segment to which said push/pull strip is connected at the distal end of the extendable pole. In an alternate embodiment of the present invention, there is an automatic extending device wherein the extendable pole comprises a plurality of nested sliding extensible pole segments arranged to slide upon urging by said push/pull strip wherein said push/pull strip is threaded through the nest of sliding extensible pole segments.

In an alternate embodiment of the present invention, there is an automatic extending device wherein said push/pull strip is tapered from where it is narrowest at the distal end of the extendable pole to widen toward said spool assembly.

In an alternate embodiment of the present invention, there is an automatic extending device comprising a loop belt or chain connecting said drive and said spool assembly wherein the loop belt or chain has an exposed portion to manually move said drive and said spool assembly to extend and to retract said extendable pole including at least a first segment fixed to a housing of said spool assembly, drive and pinch assembly wherein the width of said push pull-strip where said first segment is fixed to said housing when said extendable pole is fully extended is substantially equal to an inner diameter of said first segment.

In an alternate embodiment of the present invention, there is an automatic extending device wherein the spool assembly comprises a spool wheel turned by said one-way clutch only when turning in reverse to wind on said push/pull strip.

In an alternate embodiment of the present invention, there is an automatic extending device wherein said drive comprises a manual crank to push said push/pull strip toward the distal end of the extendable pole to lengthen the extendable pole and to wind said push/pull strip into the spool assembly to retract the extendable pole.

In an alternate embodiment of the present invention, there is an automatic extending device wherein said drive comprises said manual crank.

In an alternate embodiment of the present invention, there is an automatic extending device wherein said spool assembly comprises said manual crank.

In an alternate embodiment of the present invention, there is an automatic extending device comprising an object holder on said distal end of said extendable pole to operate on an object overhead held by said object holder.

In an embodiment, the amount of weight the device is capable of with a person operating with extended height of 10-13 meters, the functionally moveable and operable weight placed at the extending end is limited to the bending of the pole and the physical manipulability by a user. In an embodiment, the amount of weight the device is capable of with a person operating with extended height of 10-13 meters, is between up to 9-10 kilograms with a motorized unit, but that is maximum due to human operation and flexibility of the fiberglass pole.

The invention has been described by way of examples only. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the claims.

Although the invention has been explained in relation to various embodiments, it is to be understood that many other possible modifications and variations can be made without departing from the spirit and scope of the invention.

The invention claimed is:

1. An Extending Device for operating on objects overhead, comprising: a housing; an extendable pole; a push/pull strip connected to and between a spool assembly and a distal end of said extendable pole to change a length of the pole; a drive intermediate said spool assembly and extendable pole to push said push/pull strip toward the distal end of the extendable pole; a pinch assembly to pinch said push/pull strip against the drive to maintain the length of the extendable pole; wherein said spool assembly comprises a one-way clutch bearing inside a turntable drive is operatively attached to freewheel as said turntable drive pushes said push/pull strip out of said spool assembly toward said distal end and to engage to pull the push/pull strip away from the distal end back into said spool assembly.

2. The Extending Device according to claim 1 wherein said pinch assembly comprises a resilient actuator or spring arranged to exert a consistent force to regulate slippage of said push/pull strip on said drive.

3. The Extending Device according to claim 2 wherein said pinch assembly comprises an external grasp to adjust said force.

4. The Extending Device according to claim 1 wherein said pinch assembly comprises a pinch wheel, said push/pull strip pinched intermediate said drive and said pinch wheel.

5. The Extending Device according to claim 1 comprising a loop belt or chain connecting said drive and said spool assembly.

6. The Extending Device according to claim 5 wherein said housing has an exposed portion to manually move said turntable drive and said spool assembly to extend and to retract said extendable pole.

7. The Extending Device according to claim 1 wherein the extendable pole comprises a plurality of nested sliding extensible pole segments arranged to slide upon urging by said push/pull strip.

8. The Extending Device according to claim 7 including at least a first segment of said extendable pole is fixed to said housing.

9. The Extending Device according to claim 8 wherein said push pull-strip is fixed to said housing when said extendable pole is fully extended and the width of said push pull-strip is substantially equal to an inner diameter of said first segment.

10. The Extending Device according to claim 7 including at least a second segment of extendable pole is connected at the distal end of the extendable pole.

11. The Extending Device according to claim 7 wherein said push/pull strip is threaded through the nest of sliding extensible pole segments.

12. The Extending Device according to claim 1 wherein said push/pull strip is tapered from where it is narrowest at the distal end of the extendable pole to widen toward said spool assembly.

13. The Extending Device according to claim 1 wherein said spool assembly comprises a spool wheel turned by said one-way clutch only when turning in reverse to wind up said push/pull strip.

14. The Extending Device according to claim 1 wherein said turntable drive comprises a manual crank to push said push/pull strip toward the distal end of the extendable pole to lengthen the extendable pole and to wind said push/pull strip into said spool assembly to retract the extendable pole.

15. The Extending Device according to claim 1 wherein said spool assembly comprises a manual crank to push said push/pull strip toward the distal end of the extendable pole to lengthen the extendable pole and to wind said push/pull strip into said spool assembly to retract the extendable pole.

16. The Extending Device according to claim 1 comprising an object holder functionally attached to said distal end of said extendable pole to operate on an object overhead held by said object holder.

\* \* \* \* \*